Nov. 30, 1926.

R. L. RAMSEY 1,609,197

HOT AIR INCUBATOR

Filed Feb. 19, 1925   3 Sheets-Sheet 1

R. L. Ramsey
INVENTOR

BY Victor J. Evans
ATTORNEY

Nov. 30, 1926.  1,609,197
R. L. RAMSEY
HOT AIR INCUBATOR
Filed Feb. 19, 1925   3 Sheets-Sheet 2
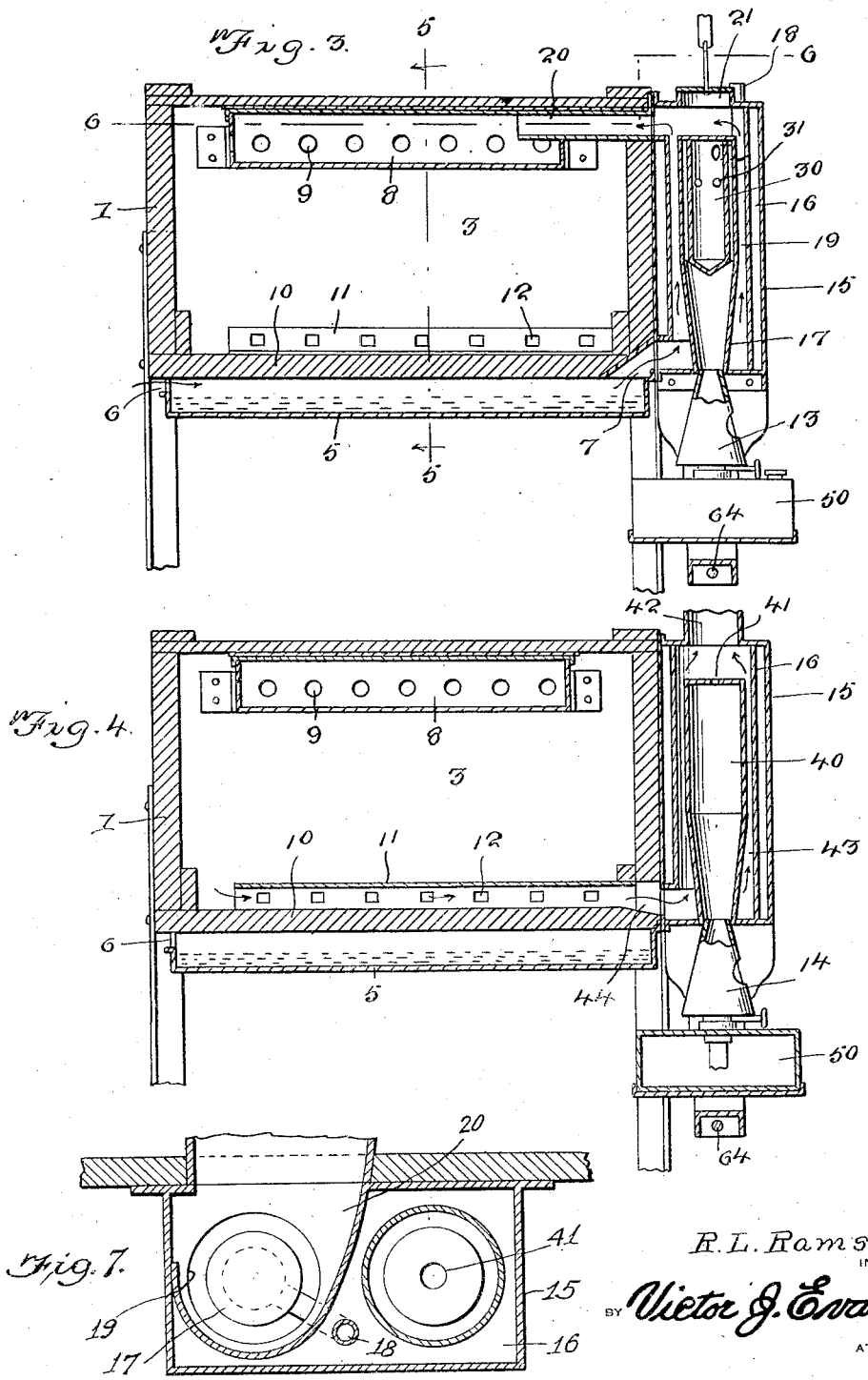

R. L. Ramsey
INVENTOR

BY Victor J. Evans
ATTORNEY

Patented Nov. 30, 1926.

1,609,197

UNITED STATES PATENT OFFICE.

ROBERT L. RAMSEY, OF BARDWELL, TEXAS.

HOT-AIR INCUBATOR.

Application filed February 19, 1925. Serial No. 10,356.

One object of my present invention is the provision of a novel and advantageous heating and ventilating means for hot air incubators whereby thorough distribution of pure warm air in all parts of the incubator at all times is assured, the air being adequately moistened as is desirable.

Another object of the invention is the provision in a hot air incubator of means whereby old dead air is exhausted from the incubator by the action of heat.

Other objects and practical advantages of the invention will be fully understood from the following description and claim when the same are read in connection with the drawings, accompanying and forming part of this specification, in which:—

Figure 2:
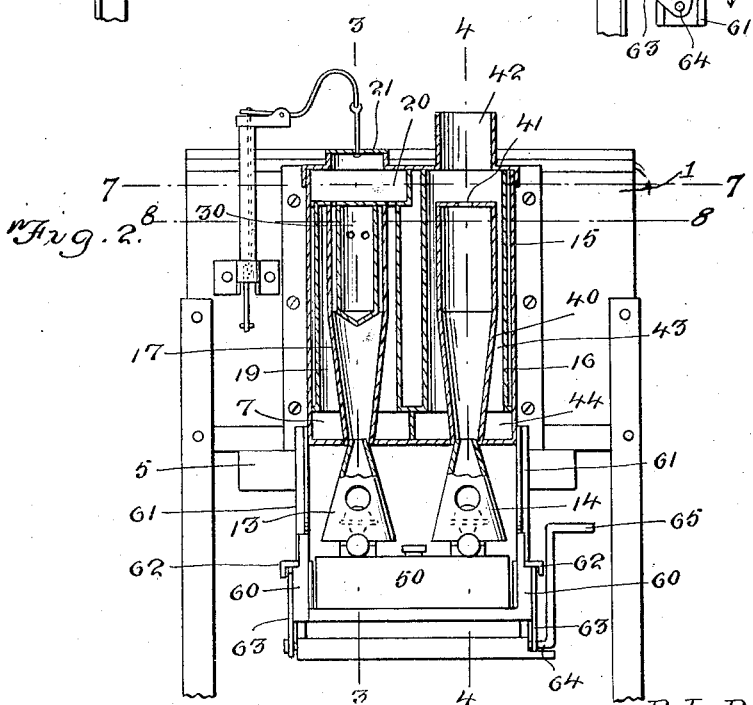
Figure 2 is a vertical cross-section taken on the line 2—2 of Figure 1.

Figures 3 and 4 are longitudinal vertical sections taken on the lines 3—3 and 4—4, respectively, of Figure 2.

Figure 5:
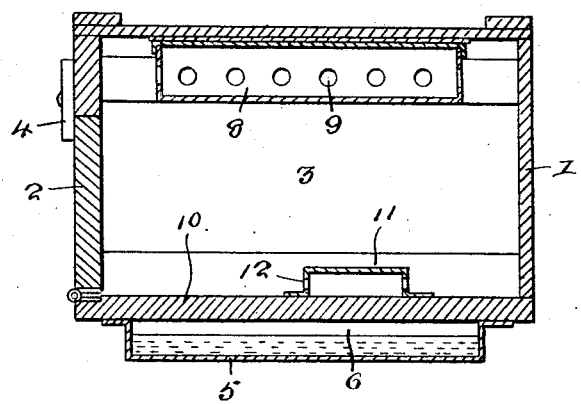

Figure 5 is a vertical cross-section on the line 5—5 of Figure 3.

Figure 6:
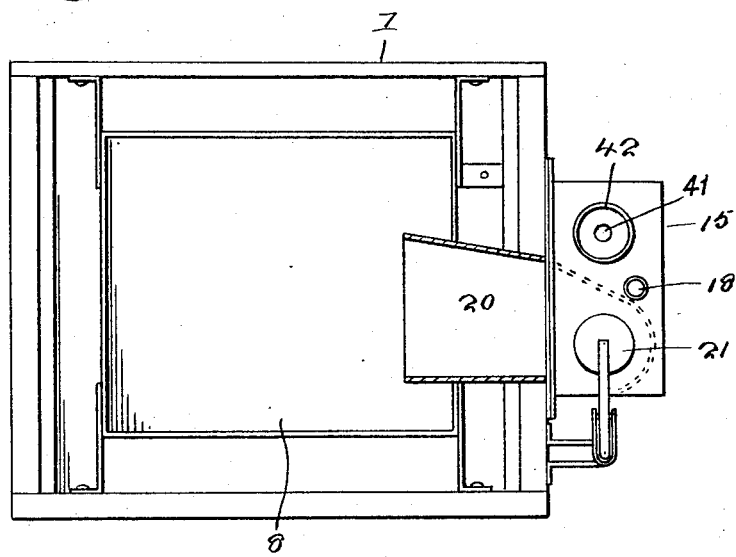

Figure 6 is a horizontal section on the line 6—6 of Figure 3.

Figure 7 is a sectional view taken on line 7—7 of Figure 2.

Figure 8:
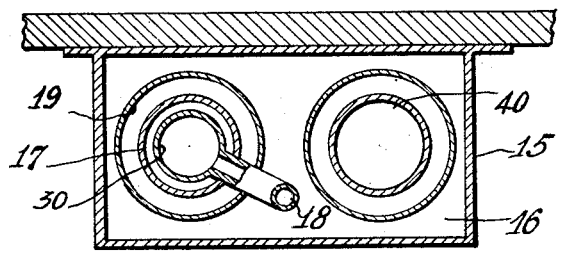

Figure 8 is a sectional view taken on line 8—8 of Figure 2.

Similar numerals of reference designate corresponding parts in all of the views of the drawings.

Among other elements the preferred embodiment of my invention comprises a casing body 1 having a hinged door 2 for access to its egg chamber 3 and also having a turn button 4 or other appropriate means for normally securing said door in closed position.

Below the casing body 1 is a pan 5 for holding water, the said pan 5 being open at one end to the atmosphere as designated by 6 in Figure 3 so as to enable atmospheric air to pass over the water en route to the air outlet of the pan, which outlet is best shown in Figure 3 and is designated by 7.

Within the egg chamber 3 is a box 8, preferably of sheet metal, located in the upper portion of the chamber 3, and having holes 9 in its upright wall, while on the bottom wall 10 of the egg chamber is a channel device 11 which is preferably formed of sheet metal and is open at its ends and closed at its top and is provided in its side walls with holes 12.

My improved incubator comprises a heating lamp 13 so designated because it is designed to furnish the heat necessary to provide high temperature in the egg chamber 3, and a ventilating lamp 14 so designated because the heat that it affords is utilized to exhaust the egg chamber 3 of dead impure air with a view to promoting healthy condition of the chicks hatched in the egg chamber.

Figure 1:
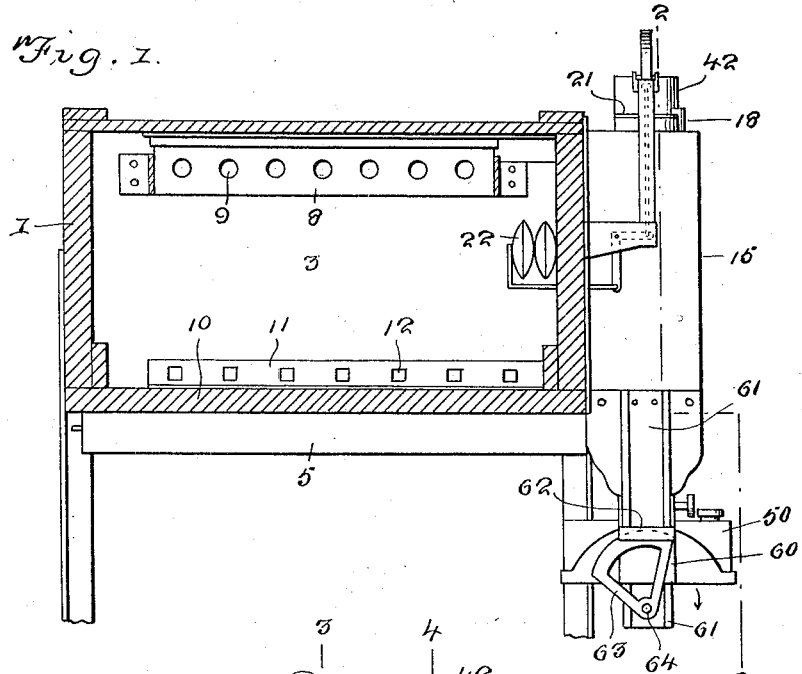
Figure 1 is a front view of the incubator constituting the preferred embodiment of my invention as the same appears when the front wall of the egg chamber is removed.

Carried by the casing body 1 which is preferably of wood is a casing 15 preferably of sheet metal, and in the casing 15 is arranged a dead air jacket 16 for insulating purposes, a flue 17 arranged at its lower end in communication with the chimney of the lamp 13, and a conduit 19 which surrounds the flue 17 and is connected at its lower end to the outlet 7 of the moisture pan 5 and is connected at its upper end to a comparatively small horizontal conduit 20 arranged to discharge into the before mentioned box 8. At its upper end the conduit 20 is open, and said open end is controlled by a thermostatic valve 21 in connection with a thermostat 22 located in the egg chamber 3 as shown in Figure 1. This thermostatic provision is adapted to avert undue heating of the chamber 3, and it may be of the well known construction illustrated or of any other construction compatible with the purpose of my invention without involving departure from the scope of the same as claimed. Manifestly when the temperature in the egg chamber 3 reaches an unduly high degree the thermostat operates to open the valve 21 whereupon a portion of the heat given off by the lamp 13 will pass to the atmosphere until the temperature in the egg chamber 3 is reduced to a predetermined degree and the valve 21 is closed for the restoration of the passage of moistened and heated air to the box 8.

In the upper portion of the flue 17 and spaced from the upper wall thereof is a spreader 30, designed to assure high heating of the wall of the said flue 17. The said spreader 30 has openings 31 in its upper portion whereby products of combustion are enabled to enter the spreader, and the said spreader is also provided with an uptake 18 which communicates with the upper portion of the interior of the spreader and also communicates with the atmosphere as shown in Figure 3. Manifestly because of the employment of the spreader 30 the products of combustion en route from the chimney of the lamp 13 to the atmosphere are caused to take a tortuous course so that said products will be used to the best advantage in the heating of the upright wall of the flue 17.

As best shown in Figures 2 and 4 the lamp 14 is arranged with its chimney in communication with an upright drum 40, the said drum 40 being located in the casing 15 and within the dead air jacket 16 and being spaced from the inner wall of said jacket 16 and being provided in its upper end with an eduction opening 41 for products of combustion which pass from said opening 41 to an uptake 42 in communication with the atmosphere. Surrounding the drum 40 is a conduit 43 the upper end of which is in full communication with the said uptake 42. The lower end of said conduit 43, however, is connected at 44 to the adjacent end of the channel 11 in the egg chamber 3. From this it follows that the heated products of combustion passing from the chimney of the lamp 14 through the drum 40 and the uptake 42 will create a suction in the conduit 43 about the drum 40 with the result that dead impure air in the egg chamber 3 will be drawn from said egg chamber 3 into the channel 11 and from said channel 11 will be caused to pass at 44 into the conduit 43 and upwardly through the latter to the uptake 42 and the atmosphere, with the result that pure air will always be maintained within the egg chamber 3, and this without chilling or sudden lowering of the temperature in the said egg chamber 3. On the other hand the supply of moist and heated atmospheric air to the egg chamber 3 without contamination of such air by products of combustion will be sufficient to maintain the necessary high temperature in the egg chamber 3 notwithstanding the continuous exhaust of impure air from the egg chamber 3 which obtains during the operation of the incubator as stated.

In accordance with one part of my invention the lamps 13 and 14 are superposed on and carried by a common oil fount 50, and the said fount 50 which with the lamps 13 and 14 is vertically adjustable is provided with end sleeves 60 which receive upright pendent guide bars 61 carried by the casing 15. The said sleeves 60 are equipped at 62 with outwardly extending arms, Figure 2, and below the said arms 62 are arranged cams 63, fixed on a rock shaft 64 that is journaled in the guide bars 61 and is provided at 65 with a crank handle. Manifestly when the cams 63 are positioned as shown in Figures 1 and 2 the lamps 13 and 14 will be arranged with the upper ends of their chimney in the lower ends of the flues 17 and 40, respectively, while when the crank handle 65 is manipulated to swing the cams 63 in the direction indicated by arrow in Figure 1, the fount 50 and the lamps thereon will be permitted to gravitate so that access may be readily gained to the fount 50 for the filling of the same with oil, and access may be gained also to the lamps for the adjustment of their wicks or for the trimming of the wicks or for the removal of the wicks and the replacement of the same with fresh wicks. After any one of the operations indicated the lamps may be readily restored to working position by swinging the cams 63 in the direction opposite to that indicated by arrow in Figure 1.

Notwithstanding the practical advantages ascribed to my novel incubator, it will be readily observed that the incubator is simple in construction and therefore not unduly expensive.

I have specifically described the preferred embodiment of my invention in order to impart an exact understanding of said embodiment. I do not desire, however, to be understood as confining myself to the structure disclosed, my invention being defined by my appended claims within the scope of which structural changes may be made without involving departure from my invention.

Having described my invention, what I claim and desire to secure by Letters-Patent, is:—

In an incubator, an egg chamber formed in a casing body, a casing connected to the casing body and containing a dead air jacket, a moisture pan carried under the casing body and open at one end to the atmosphere, a flue arranged in the said casing and open at its lower end, a lamp having a chimney in communication with said flue, a spreader in the upper portion of said flue and having an inlet and an outlet for products of combustion, a conduit surrounding said flue and connected at one end with the moisture pan and at its other end with the upper portion of the egg chamber, a second flue arranged in the casing and open at its lower end and having an opening in its upper end, a lamp in communication with the lower end of said flue, and a conduit surrounding the latter flue and adapted to discharge into the atmosphere and connected with the lower portion of the egg chamber.

In testimony whereof I affix my signature.

ROBERT L. RAMSEY.